US010261886B2

(12) United States Patent
Amir

(10) Patent No.: US 10,261,886 B2
(45) Date of Patent: Apr. 16, 2019

(54) FUNCTION CALL VISUALIZATION

(71) Applicant: HEWLETT PACKARD ENTERPRISE DEVELOPMENT LP, Houston, TX (US)

(72) Inventor: Jonatan Amir, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 210 days.

(21) Appl. No.: 15/347,370

(22) Filed: Nov. 9, 2016

(65) Prior Publication Data

US 2018/0129583 A1 May 10, 2018

(51) Int. Cl.
*G06F 9/44* (2018.01)
*G06F 11/36* (2006.01)
*G06F 11/32* (2006.01)

(52) U.S. Cl.
CPC .......... *G06F 11/3636* (2013.01); *G06F 11/32* (2013.01)

(58) Field of Classification Search
CPC .. G06F 8/443; G06F 11/3466; G06F 11/3612; G06F 11/3664
See application file for complete search history.

(56) References Cited

U.S. PATENT DOCUMENTS 5,889,999 A * 3/1999 Breternitz, Jr. .......... G06F 8/445 712/201
6,651,243 B1 11/2003 Berry et al.
7,174,536 B1 2/2007 Kothari et al.
7,424,530 B2 9/2008 Chagoly et al.
8,464,221 B2 6/2013 Zheng et al.
8,516,301 B2 8/2013 Beck et al.
8,782,614 B2 7/2014 Basak et al.
2003/0061600 A1* 3/2003 Bates .................. G06F 11/3664 717/133
2003/0226133 A1* 12/2003 Grover .................... G06F 8/443 717/140
2004/0128659 A1* 7/2004 Robison ................ G06F 8/4435 717/153

(Continued)

FOREIGN PATENT DOCUMENTS

WO WO-2017142535 A1 8/2017

OTHER PUBLICATIONS

Sinha , A., "JexVis: An Interactive Visualization Tool for Except Ion Call Graphs in Java," (Research Paper), Dec. 20, 2005, 10 pages, available at https://www.cs.ubc.ca/~tmm/courses/cpsc533c-05-fall/projects/anirbans/report.pdf.

*Primary Examiner* — Chat C Do
*Assistant Examiner* — Lenin Paulino

(57) ABSTRACT

In one example in accordance with the present disclosure, a system may include a processor and a memory comprising instructions executable by the processor to generate a plurality of visual indicators on a flow graph. Each of the visual indicators may correspond to one of a plurality of functions performed during execution of software code. The memory may comprise instructions executable by the processor to generate, a connector to visually link a first visual indicator, corresponding to a first function, to a second visual indicator, corresponding to a second function. The memory may comprise instructions executable by the processor to generate a tail attached to the first visual indicator, a dimension of the tail corresponding to a duration of the first function before the first function call.

18 Claims, 5 Drawing Sheets

(56) References Cited

U.S. PATENT DOCUMENTS

2013/0103719 A1* 4/2013 Gotz .................... G06T 11/206
707/798
2016/0085527 A1* 3/2016 de Lima Ottoni ...... G06F 8/443
717/157

* cited by examiner

FUNCTION CALL VISUALIZATION

BACKGROUND

Software analysis can produce valuable information about execution of software code. This information may be reviewed by a software performance engineer to find the root cause of a performance and/or an availability problem in the software code.

BRIEF DESCRIPTION OF THE DRAWINGS

The following detailed description references the drawings, wherein.

DETAILED DESCRIPTION

Figure 1:
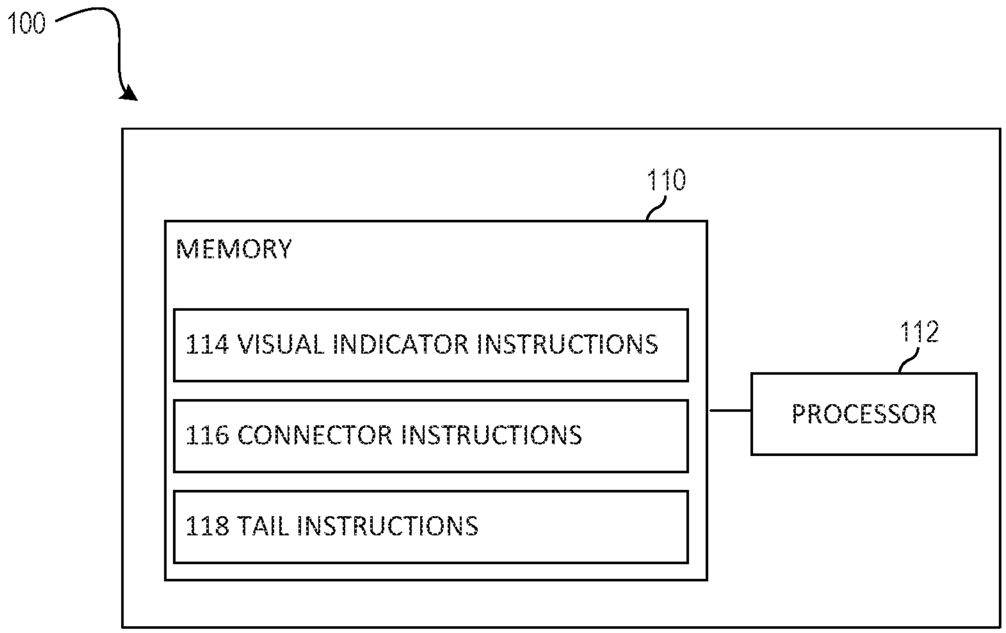
FIG. 1 is a block diagram of an example system for function call visualization.

A trace record for software code may include function calls, exceptions, log entries and performance metrics. Function calls are the call tree of functions in the software code invoked during execution. Exceptions are the unexpected application behavior during execution. Log entries are text written by the software code into log files during execution. Performance metrics are measurements recorded during execution, such as CPU and memory utilization. Software analysis of the trace record may identify a variety of root causes performance and/or an availability problem in the software code and may include, for example, functions that take a disproportionate amount of time to execute, excessive function invocation, unexpected behavior, etc.

A visualization of the trace record may assist someone analyzing the software code, such as a software performance engineer, in reviewing the software code as well as allowing the analyzer to quickly and visual identify properties of the software code.

Aspects of the present disclosure describe a visualization of the trace record. The visualization may include a plurality of visual indicators corresponding, respectively, to a plurality of functions executed by the software. The visualization may include connectors representing function transitions including both function calls and return calls. In addition, the visualization may include an additional visual extension attached to the visual indicator, referred to herein as a "tail". The tail may be connected to the edge of the visual indicator and the proportions of the tail area may correspond to duration of a function before the function makes a function call\return call.

The longest function transition may have the largest tail area in the graph, allowing a reviewer to quickly identify the function that took the longest amount of time to execute. The proportions of each other tail may be proportional to the largest tail area. In this manner, the visualization quickly and visually identifies the length of each function in relation to each other function executed by the software code. Method with longer duration are emphasized and functions that are taking the longest amount of time to execute can be easily determined. Moreover, because the return calls are also marked are also included in the visualizations, exceptions can be located on an edge corresponding to the exact time in the code flow in which the exception occurred. The visual indicators may be visualized clock wise in the function calls chronological order, allowing the user to follow the visualization in sequence in order to get the concept of the calls time flow.

An example system for function call visualization is presented. The system may include a processor a memory comprising instructions executable by the processor to generate a plurality of visual indicators on a flow graph, each of the visual indicators corresponding to a respective one of a plurality of functions performed during execution of software code. The memory may comprise instructions executable by the processor to generate, on the flow graph, a connector to visually link a first visual indicator of the plurality of visual indicators corresponding to a first function of the plurality of functions to a second visual indicator of the plurality of visual indicators corresponding to a second function of the plurality of functions, the connector having a direction indicator visually indicating that the first function made a first call to the second function. The memory may comprise instructions executable by the processor to generate, on the flow graph, a tail attached to the first visual indicator, a dimension of the tail corresponding to a duration of the first function before the first function call.

FIG. 1 is a block diagram of an example system 100 for user interest and relationship determination. System 100 may include a processor 102 and a memory 104 that may be coupled to each other through a communication link (e.g., a bus). Processor 102 may include a Central Processing Unit (CPU) or another suitable hardware processor. In some examples, memory 104 stores machine readable instructions executed by processor 102 for system 100. Memory 104 may include any suitable combination of volatile and/or non-volatile memory, such as combinations of Random Access Memory (RAM), Read-Only Memory (ROM), flash memory, and/or other suitable memory. Memory 104 may also include a random access non-volatile memory that can retain content when the power is off.

Memory 104 stores instructions to be executed by processor 102 including instructions for and/or other components. According to various implementations, user interest and relationship determination system 100 may be implemented in hardware and/or a combination of hardware and programming that configures hardware. Furthermore, in FIG. 1 and other Figures described herein, different numbers of components or entities than depicted may be used.

Processor 102 may execute visual indicator instructions 114 to generate a plurality of visual indicators on a flow graph. Each of the visual indicators may correspond to a respective one of a plurality of functions performed during execution of software code. System 100 may be used to visualize the flow of software code. The software code may include a plurality of functions. A first function belonging to the plurality may perform a function call to execute a second function of the software code. Upon completion of the second function, the second function may perform a function call to return to the first function. Alternatively and/or additionally, the second function may perform a function call to execute a third function, and so on. In some aspects. The first function may make multiple calls to the second function, the second function may make multiple calls to the third function, and so on.

Figure 2:
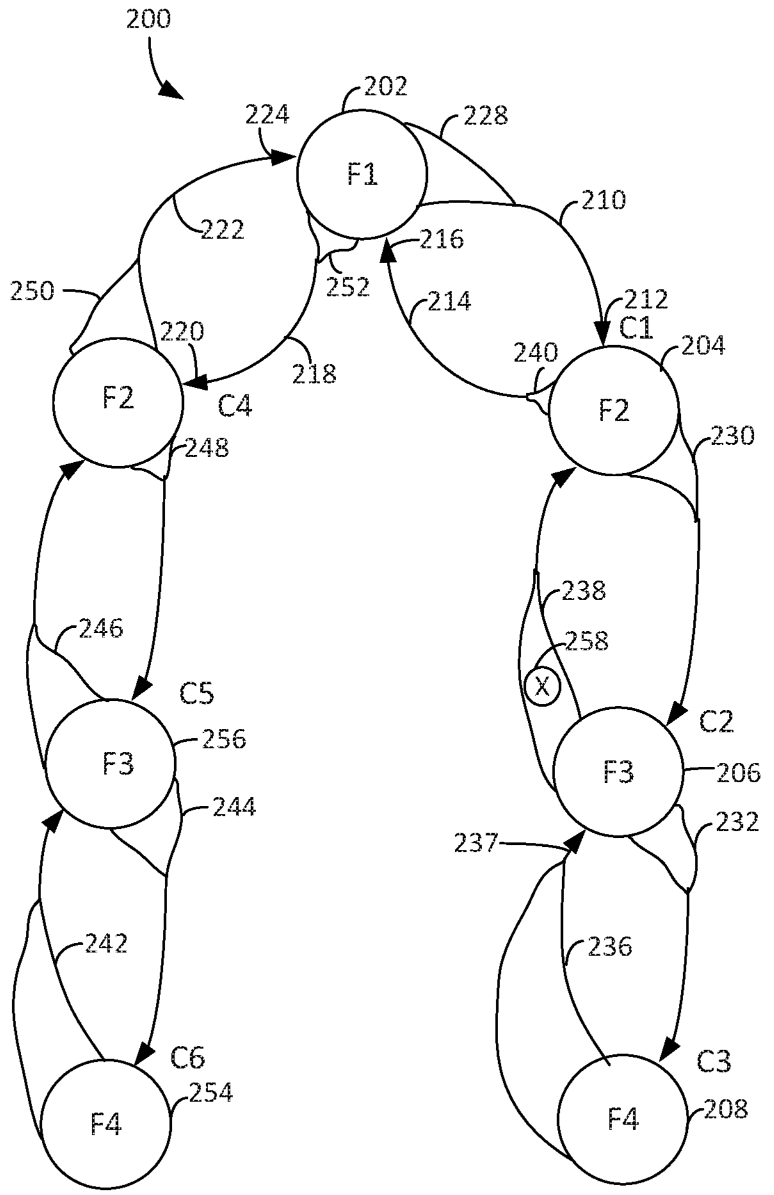
FIG. 2 is a flowchart of an example function call visualization.

Turning briefly to FIG. 2, an example visualization 200 is illustrated. The visualization includes a plurality of visual indicators, which in visualization 200 are depicted as nodes.

Each of the nodes may correspond to a function of a software code that is being visualized. The plurality of visual indicators may include node 202 (corresponding to function F1), node 204 (corresponding to function F2), node 206 (corresponding to function F3) and node 208 (corresponding to function F4). The visualization 200 may correspond to a software code where a first function call Turning again to FIG. 1, processor 102 may execute connector instructions 116 to generate, on the flow graph, a connector to visually link a first visual indicator of the plurality of visual indicators corresponding to a first function of the plurality of functions to a second visual indicator of the plurality of visual indicators corresponding to a second function of the plurality of functions. The connector may have a direction indicator visually indicating that the first function made a call to the second function. The connector may be an arrow having an arrowhead indicating a direction of the first function call from the first function to the second function.

Turning again to FIG. 2, the example visualization 200 includes a connector 210 visually linking the node 202 (corresponding to function F1) to node 204 (corresponding to function F2), representing a function call (C1) made from function F1 to function F2. Connector 210 may include a direction indicator indicating that the first function made a call to the second function. In visualization 200, the direction indicator may be arrow 212 attached to connector 210. Visualization 200 further shows a return call from function F2 (node 204) to function F1 (node 202). The return call may be performed to return to Function F1 after Function F2 has completed. The return call may be represented by connector 214, linking node 204 to node 202. Connector 214 may include direction indicator 216, indicating that the second function made the return call to the first function.

As illustrated in visualization 200, function F1 may perform multiple function calls to function F2. As described above, the function call (C1) from function 202 to node 204 is represented by connector 210 and the return call is represented by connector 214. Similarly, function F1 may make a second call to Function F2 (C4), represented by connector 218 with direction indicator 220.

The visualization 200 also includes other function calls, including a first call C2 from function F2 to function F3 and a second call C5 from function F2 and function F3, as well as including return calls from function F3 to function F2. Similarly, visualization 200 includes a first call C3 from function F3 to function F4 and a second call C6 from function F3 and function F4, as well as including return calls from function F4 to function F3.

Turning again to FIG. 1, processor 102 may execute tail instructions 118 to generate, on the flow graph, a tail attached to the first visual indicator, a dimension of the tail corresponding to a duration of the first function before the first function call.

The tail may be attached to an edge of the first visual indicator. The tail may be proportional to a duration of time taken to complete the first function before the first call (e.g. the call from the first function to the second function). The dimensions of the tail include a total surface area of the tail.

In some aspects, processor 102 may execute tail instructions 118 to generate a plurality of tails on the flow graph, the plurality of tails comprising the tail. Each of the tails may correspond to a function call from an origin function to a called function and the origin and called functions may belong to the plurality of functions. The respective dimension of each tail in the plurality of tails corresponds to the length of time it takes the called function to execute before making a return call to the origin function. The plurality of tails may include a longest tail corresponding to a function that takes a longest amount of time to complete in comparison to each of the other functions performed during execution of the software code. Each tail in the plurality of tails, other than the longest tail, may have dimensions that are sized proportionally to the longest tail.

For example, a second tail may be attached to an edge of the second visual indicator, the second tail proportional to a duration of time taken to complete the second function before a second function call from the second function to the first function. The second function call may be made upon completion of the second function.

Turning again to FIG. 2, the example visualization 200 may include tails 228-252. For example, tail 228 may correspond to the length of time that function F1 (represented by node 202) executes before making a function call to function F2 (represented by node 204). The tail 228 may be connected to node 202 to visualize that it corresponds to the execution time of function F1.

In visualization 200, the execution of function F4 (represented by node 208) may take the longest amount of time (compared to the execution of the other functions) to execute before function F4 makes a return call to function F3 (represented by node 206). Accordingly, the tail 236, corresponding to the execution time of Function F4 before the function return call to function F3, may be the largest tail on visualization 200. The largest tail may be signified by the tail with the largest surface area. As illustrated in visualization 200, connector 237 may be smaller in size than the connectors generated on visualization 200 in order to compensate for the larger tail 236.

In visualization, a time of a second execution of a function F4 (represented by node 254) may take the second longest amount of time (compared to the execution of the other functions) to execute before function F4 makes a function call to function F3 (represented by node 256). Accordingly, the tail 242, corresponding to the execution time of Function F4 before the return call to function F3, may be the second largest tail on visualization 200. Similarly, a time of execution of function F2 (represented by node 204) may take the shortest amount of time (compared to the execution of the other functions) to execute before function F2 makes a return call to function F1 (represented by node 202). Accordingly, the tail 202, corresponding to the execution time of Function F2 before the return call to function F1, may be the smallest tail on visualization 200.

Turning again to FIG. 1, processor 102 may also execute tail instructions 118 to generate an element attached to the tail. The element may correspond to, for example, the status of a function, an exception of the function, a log entry of the function, a performance metric of the function, etc. Example performance metrics include CPU utilization, memory utilization and/or other measurements recorded during execution.

Turning again to FIG. 2, the example visualization 200 may include element 258. Element 258 may represent an exception that occurred during the execution of function F3 before returning to function F2 and thus may be placed on tail 258. Tail 258 may correspond to the execution of function F3.

Figure 3:
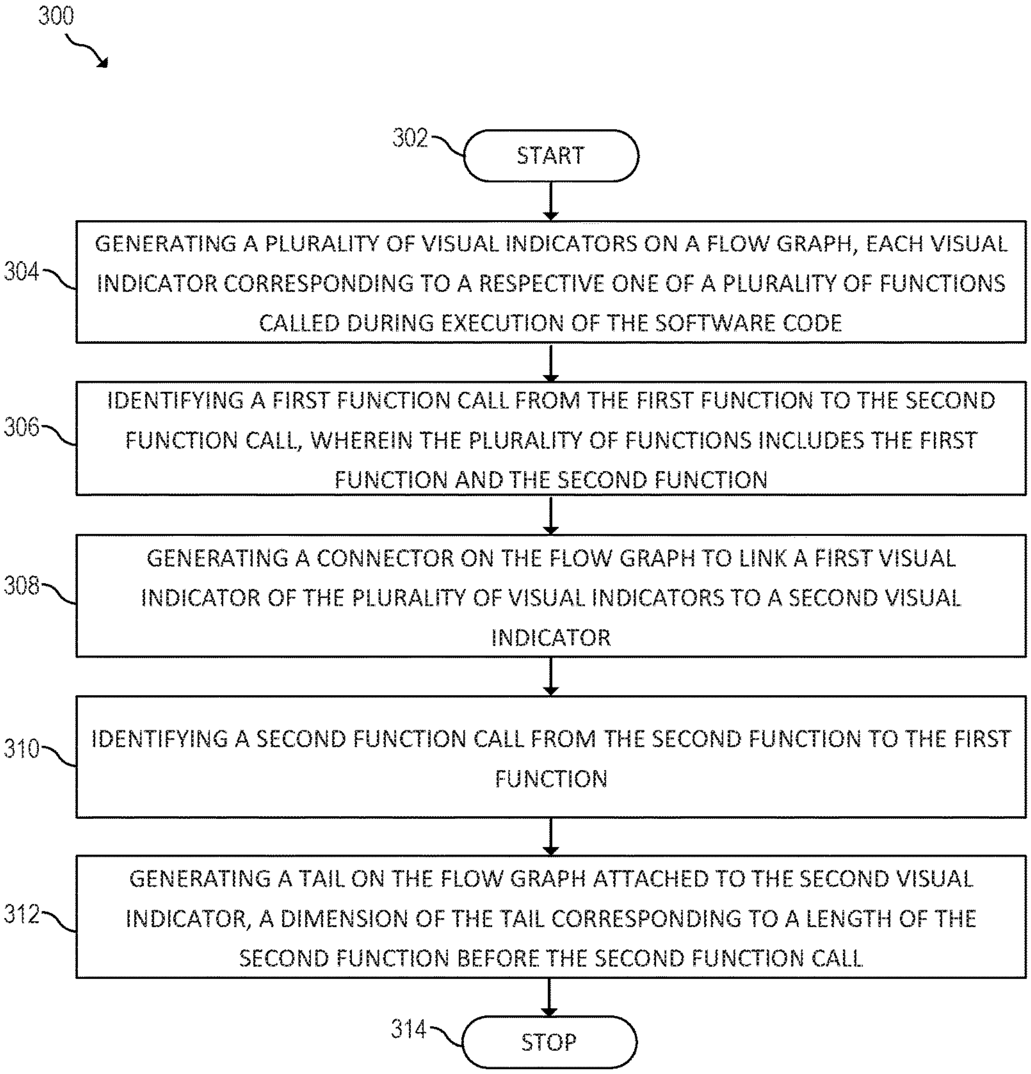
FIG. 3 is a block diagram of an example method for function call visualization.

FIG. 3 is a flowchart of an example method 300 for function call visualization. Method 300 may be described below as being executed or performed by an environment, for example environment 100 of FIG. 1, or a system, for example, system 500 of FIG. 5 described below. Other suitable systems and/or computing devices may be used as well. Method 300 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 300 may be implemented in the form of electronic circuitry (e.g., hardware). At least one block of method 300 may be executed substantially concurrently or in a different order than shown in FIG. 3. Method 300 may include more or less blocks than are shown in FIG. 3. Some of the blocks of method 300 may, at certain times, be ongoing and/or may repeat.

Method 300 may start at block 302 and continue to block 304, where the method 300 may include generating a plurality of visual indicators on a flow graph. At block 306, the method may include identifying a first function call from the first function to the second function call, wherein the plurality of functions includes the first function and the second function. At block 308, the method may include generating a connector on the flow graph to link a first visual indicator of the plurality of visual indicators, corresponding to a first function of the plurality of functions, to a second visual indicator of the plurality of visual indicators corresponding to a second function of the plurality of functions. The connector may be an arrow having an arrowhead indicating a direction of the first function call from the first function to the second function. At block 310, the method may include identifying a second function call from the second function to the first function and at block 312, the method may include generating a tail on the flow graph attached to the second visual indicator. The second function call may be made upon completion of the second function the tail is attached to an edge of the first visual indicator.

A dimension of the tail may correspond to a length of the second function before the second function call. The tail may be proportional to a duration of time taken to complete the first function before the first function call. The dimensions of the tail may include a total surface area of the tail. The method may proceed to block 314, where the method may end.

Figure 4:
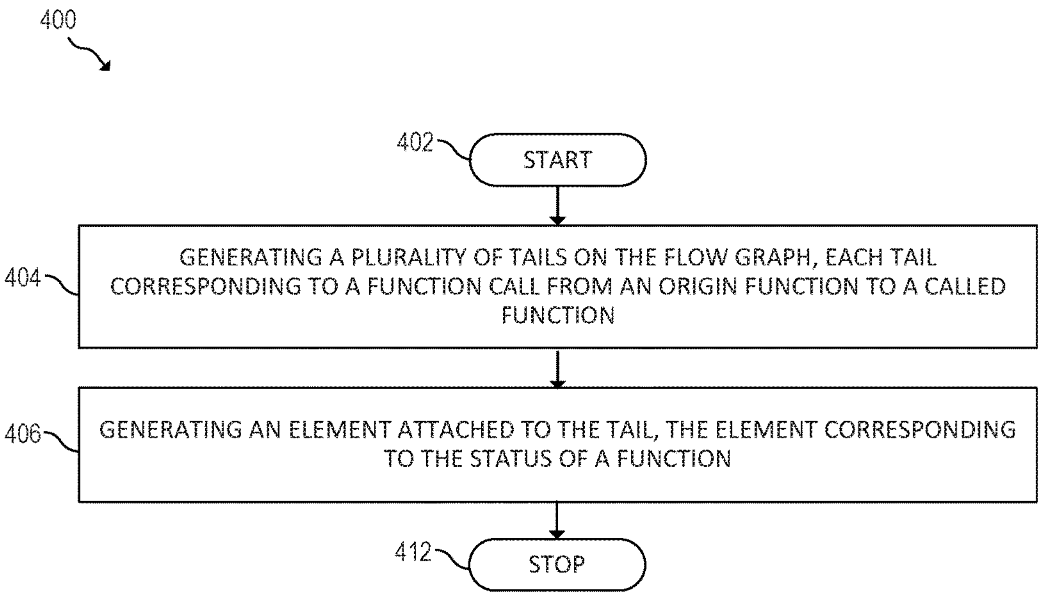
FIG. 4 is a block diagram of an example method for function call visualization with multiple function calls.

FIG. 4 is a flowchart of another example method 400 for function call visualization. Method 400 may be described below as being executed or performed by an environment, for example environment 100 of FIG. 1, or a system, for example, system 500 of FIG. 5 described below. Other suitable systems and/or computing devices may be used as well. Method 400 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 400 may be implemented in the form of electronic circuitry (e.g., hardware). At least one block of method 400 may be executed substantially concurrently or in a different order than shown in FIG. 4. Method 400 may include more or less blocks than are shown in FIG. 4. Some of the blocks of method 400 may, at certain times, be ongoing and/or may repeat.

Method 400 may start at block 402 and continue to block 404, where the method 400 may include generating a plurality of tails on the flow graph wherein each of the tails corresponds to a function call, from an origin function to a called function. The origin and called functions may belong to the plurality of functions (i.e. as discussed above in reference to block 304 of method 300). The respective dimension of each tail in the plurality of tails may correspond to the length of time it takes the called function to execute before making a return call to the origin function. The plurality of tails may comprising the tail discussed above in reference to block 312 of method 300). The plurality of tails may include a longest tail corresponding to a function that takes a longest amount of time to complete in comparison to each of the other functions performed during execution of the software code. Each tail in the plurality of tails, other than the longest tail, may have dimensions that are sized proportionally to the longest tail.

At block 406, the method may include generating an element attached to the tail, the element corresponding to the status of the second function. The status of the second function may be a function failure, an exception of the function, a log entry of the function, a performance metric of the function, etc. The method may proceed to block 408, where the method may end.

Figure 5:
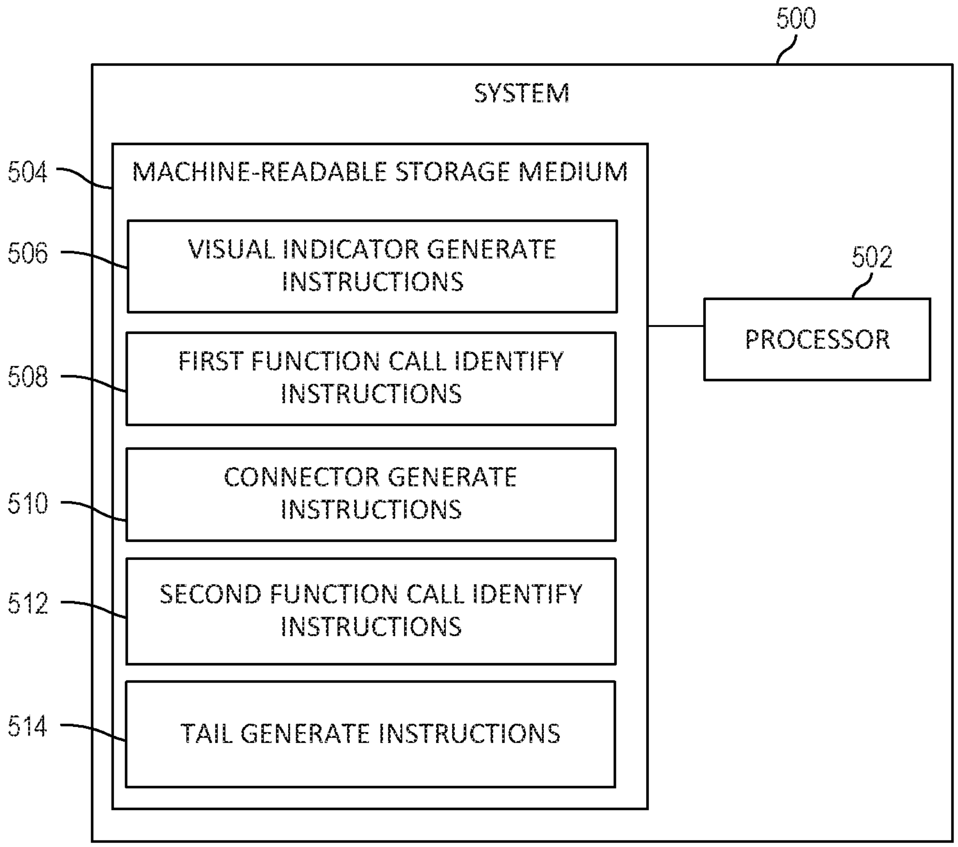
FIG. 5 is a block diagram of an example system for function call visualization.

FIG. 5 is a block diagram of an example system 500 for function call visualization. System 500 may be similar to environment 100 of FIG. 1, for example. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510, 512 and 514 to perform function call visualization. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, visual indicator generate instructions 506, when executed by a processor (e.g., 502), may cause system 500 to generate a plurality of visual indicators on a flow graph. Each of the visual indicators may correspond to a respective one of a plurality of functions performed during execution of software code. First function call identify instructions 506, when executed by a processor (e.g., 502), may cause system 500 to identify a first function call from a first function to a second function. The plurality of functions includes the first function and the second function.

Connector generate instructions 506, when executed by a processor (e.g., 502), may cause system 500 to generate a connector on the flow graph to link a first visual indicator of the plurality of visual indicators corresponding to the first function to a second visual indicator of the plurality of visual indicators corresponding to the second function. The connector may have a direction indicator visually indicating that the first function made the first function call. The connector may be an arrow having an arrowhead indicating a direction of the first function call from the first function to the second function.

Second function call identify instructions 506, when executed by a processor (e.g., 502), may cause system 500 to identify a second function call from the second function to the first function. Tail generate instructions 506, when executed by a processor (e.g., 502), may cause system 500 to generate a first tail on the flow graph attached to the second visual indicator, dimensions of the tail corresponding to a duration of the second function before the second function makes the second function call. The second function call may be made upon completion of the second function the tail is attached to an edge of the first visual indicator.

A dimension of the tail may correspond to a length of the second function before the second function call. The tail may be proportional to a duration of time taken to complete the first function before the first function call. The dimensions of the tail may include a total surface area of the tail. The method may proceed to block 314, where the method may end.

Tail generate instructions 506, when executed by a processor (e.g., 502), may also cause system 500 to generate a plurality of tails on the flow graph wherein each of the tails corresponds to a function call, from an origin function to a called function. The origin and called functions may belong to the plurality of functions. The respective dimension of each tail in the plurality of tails may correspond to the length of time it takes the called function to execute before making a return call to the origin function. The plurality of tails may include a longest tail corresponding to a function that takes a longest amount of time to complete in comparison to each of the other functions performed during execution of the software code. Each tail in the plurality of tails, other than the longest tail, may have dimensions that are sized proportionally to the longest tail.

Tail generate instructions 506, when executed by a processor (e.g., 502), may also cause system 500 to generate an element attached to the tail, the element corresponding to the status of the second function. The status of the second function may be a function failure, an exception of the function, a log entry of the function, a performance metric of the function, etc. The method may proceed to block 408, where the method may end.

The foregoing disclosure describes a number of examples for function call visualization. The disclosed examples may include systems, devices, computer-readable storage media, and methods for function call visualization. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A system comprising:
- a processor; and
- a memory comprising instructions executable to cause the processor to:
  - generate a plurality of visual indicators on a flow graph, each of the visual indicators corresponding to a respective one of a plurality of functions performed during execution of software code;
  - generate, on the flow graph, a first connector to visually link a first visual indicator of the plurality of visual indicators corresponding to a first function of the plurality of functions to a second visual indicator of the plurality of visual indicators corresponding to a second function of the plurality of functions, the first connector having an arrowhead visually indicating a direction that the first function made a first call to the second function;
  - determine a time duration of the first function before the first function call to the second function; and
  - attach, on the flow graph, a tail from the first visual indicator to the first connector to represent the time duration of the first function before the first function call, a dimension of the tail corresponding to the time duration of the first function before the first function call.

2. The system of claim 1 wherein the memory comprises instructions executable by the processor to:
- generate a plurality of tails on the flow graph, the plurality of tails comprising the tail, wherein each of the tails corresponds to a function call, from an origin function to a called function, the origin and called functions belonging to the plurality of functions, wherein the respective dimension of each tail in the plurality of tails corresponds to a length of time for the called function to execute before making a return call to the origin function.

3. The system of claim 2 wherein the plurality of tails includes a longest tail corresponding to a function that takes a longest amount of time to complete in comparison to each of the other functions performed during execution of the software code.

4. The system of claim 3 wherein each tail in the plurality of tails, other than the longest tail, has a dimension that is sized proportionally to the longest tail.

5. The system of claim 1 wherein the tail is attached to an edge of the first visual indicator.

6. The system of claim 1 wherein the dimension of the tail is proportional to a duration of time taken to complete the first function before the first function call.

7. The system of claim 1 wherein the dimension of the tail includes a total surface area of the tail.

8. The system of claim 1 wherein the instructions are executable to cause the processor to make a second call from the second function to the first function, upon completion of the second function.

9. The system of claim 1 wherein the instructions are executable to cause the processor to generate an element attached to the tail, the element corresponding to a status of the second function.

10. The system of claim 9 wherein the status of the second function is a function failure.

11. A method comprising:

by a processor of a computing device:

generating a plurality of visual indicators on a flow graph, each visual indicator corresponding to a respective one of a plurality of functions called during execution of software code;

identifying a first function call from the first function to a second function, wherein the plurality of functions includes the first function and the second function;

generating a first connector on the flow graph to link a first visual indicator of the plurality of visual indicators corresponding to the first function of the plurality of functions to a second visual indicator of the plurality of visual indicators corresponding to the second function of the plurality of functions, the first connector having an arrowhead visually indicating a direction that the first function made the first function call to the second function;

determining a time duration of the first function before the first function call to the second function; and attaching a tail on the flow graph from the first visual indicator to the first connector to represent the time duration of the first function before the first function call, a dimension of the tail corresponding to the time duration of the first function before the first function call.

12. The method of claim 11 comprising:

generating a plurality of tails on the flow graph, the plurality of tails comprising the tail, wherein each of the tails corresponds to a function call, from an origin function to a called function, the origin and called functions belonging to the plurality of functions, wherein the respective dimension of each tail in the plurality of tails corresponds to a length of time for the called function to execute before making a return call to the origin function.

13. The method of claim 12 wherein the plurality of tails includes a longest tail corresponding to a function that takes a longest amount of time to complete in comparison to each of the other functions performed during execution of the software code.

14. The method of claim 13 wherein each tail in the plurality of tails, other than the longest tail, has a dimension that is sized proportionally to the longest tail.

15. A non-transitory machine-readable storage medium encoded with instructions, the instructions executable by a processor of a system to cause the system to:

generate a plurality of visual indicators on a flow graph, each of the visual indicators corresponding to a respective one of a plurality of functions performed during execution of software code;

identify a first function call from a first function to a second function, wherein the plurality of functions includes the first function and the second function;

generate a first connector on the flow graph to link a first visual indicator of the plurality of visual indicators corresponding to the first function to a second visual indicator of the plurality of visual indicators corresponding to the second function, the first connector having an arrowhead visually indicating a direction that the first function made the first function call to the second function;

determine a time duration of the first function before the first function call to the second function; and attach a first tail on the flow graph from the first visual indicator to the first connector to represent the time duration of the first function before the first function call, a dimension of the tail corresponding to the time duration of the first function before the first function makes the first function call to the second function.

16. The non-transitory machine-readable storage medium of claim 15, wherein the first tail is attached to an edge of the first visual indicator.

17. The non-transitory machine-readable storage medium of claim 15, wherein the instructions are executable to cause the system to:

identify a second function call from the second function to the first function;

generate a second connector from the second function to the first function;

generate a second tail on the flow graph from the second function to the second connector to represent a duration of time for the second function to complete before the second function call to the first function, wherein a dimension of the second tail is proportional to the duration of time taken to complete the second function before the second function call.

18. The non-transitory machine-readable storage medium of claim 15, wherein the dimension of the first tail include a total surface area of the tail.

* * * * *